United States Patent [19]

Hauke

[11] 3,823,437
[45] July 16, 1974

[54] WINDSHIELD WIPER BLADE ASSEMBLY
[75] Inventor: Gary F. Hauke, New Albany, Ohio
[73] Assignee: Perma-Blade, Inc., Columbus, Ohio
[22] Filed: Aug. 4, 1972
[21] Appl. No.: 277,923

[52] U.S. Cl. ............................................ 15/250.42
[51] Int. Cl. ............................................. B60s 1/04
[58] Field of Search....... 15/250.42, 250.39, 250.36, 15/250.31

[56] References Cited
UNITED STATES PATENTS
| 3,132,367 | 5/1964 | Wise | 15/250.42 |
| 3,153,254 | 10/1964 | Lenz et al. | 15/250.42 |
| 3,233,273 | 2/1966 | Anderson | 15/250.42 |
| 3,421,175 | 1/1969 | Roberts | 15/250.42 |
| 3,430,285 | 3/1969 | Rickett | 15/250.42 |
| 3,636,583 | 1/1972 | Rosen | 15/250.36 |
| 3,703,018 | 11/1972 | Seiler et al. | 15/250.42 |
| 3,707,741 | 1/1973 | Roberts | 15/250.42 |

FOREIGN PATENTS OR APPLICATIONS
1,014,859  8/1957  Germany ........................ 15/250.36

Primary Examiner—Leon G. Machlin
Attorney, Agent, or Firm—Palmer Fultz, Esq.

[57] ABSTRACT

An improved windshield wiper blade assembly characterized by a novel blade holder and flexible wiper blade assembly which is removably mounted on the main frame means attached to the wiper element. The assembly is further characterized by a retaining means for removably mounting the flexible wiper blade in the blade holder.

1 Claim, 8 Drawing Figures

PATENTED JUL 16 1974
3,823,437
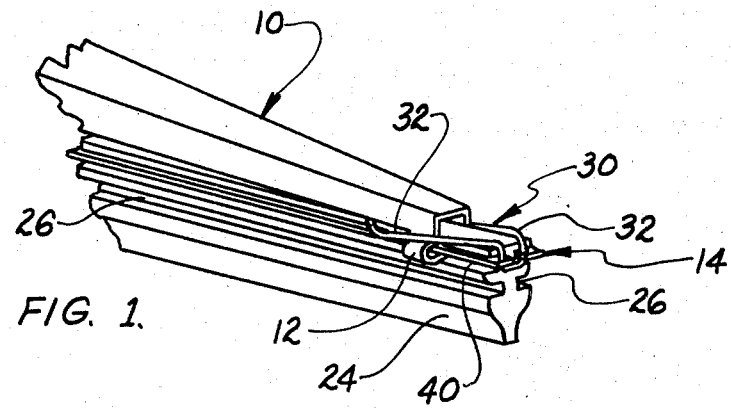
FIG. 1.
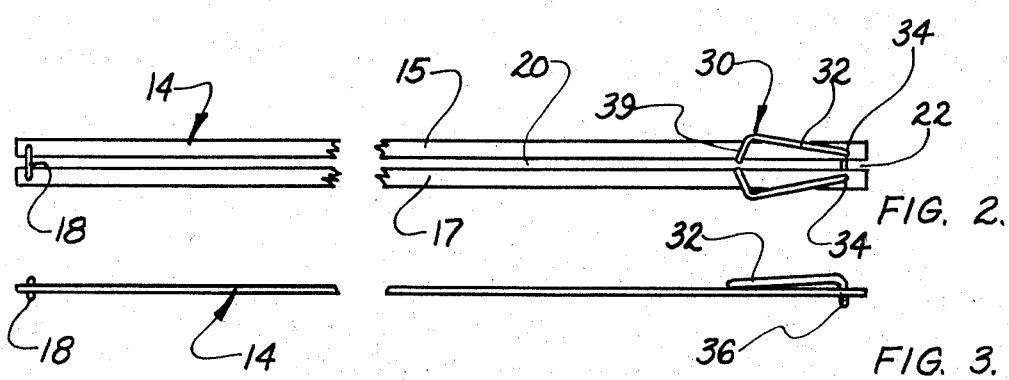
FIG. 2.
FIG. 3.
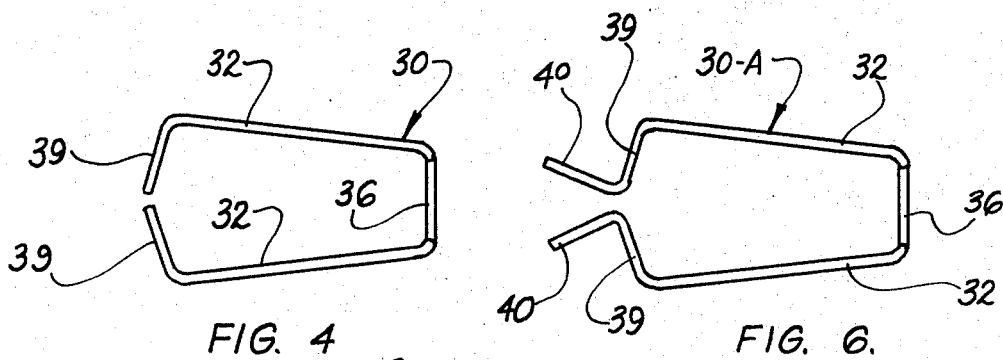
FIG. 4.
FIG. 6.
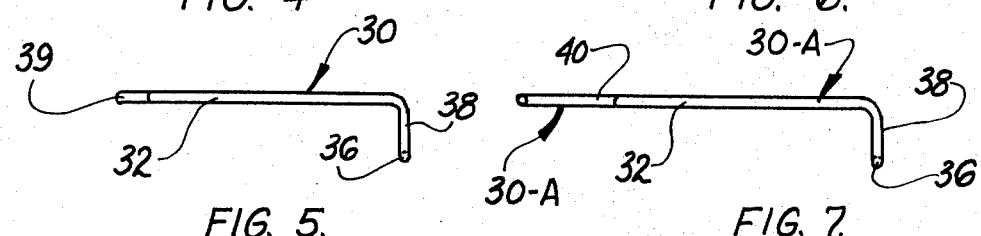
FIG. 5.
FIG. 7.
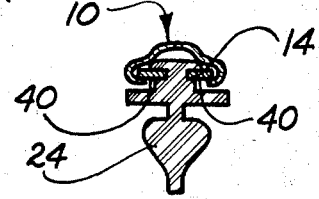
FIG. 8.

WINDSHIELD WIPER BLADE ASSEMBLY

BACKGROUND OF THE INVENTION

This invention relates to an improved windshield wiper blade assembly and more particularly to a novel design for retaining the flexible wiper blade to the frame means.

SUMMARY OF THE INVENTION

In general, the wiper blade assembly of the present invention comprises a conventional frame means which is pivotally attached to the conventional wiper blade arm. Such frame means includes blade holder receiving means for receiving a blade holder or the like, which in turn serves to hold the flexible wiper blade which engages the windshield.

In accordance with the present invention the above-mentioned blade holder comprises an open-ended slot for slideably receiving the flexible wiper blade.

The assembly further includes a novel closure means or clip means which is removably mounted on the blade holder at the open end of the slot with such clip means serving to retain the flexible wiper blade in the slot of the holder.

The clip also engages the frame means so as to retain the blade holder in position thereon.

It is therefore an object of the present invention to provide an improved wiper blade assembly which includes a novel blade holder construction that includes a longitudinally extending open-ended slot for slideably receiving the flexible wiper blade and closure means for said slot for removably retaining the flexible blade element in assembled relationship with the holder.

Further objects and advantages of the present invention will be apparent from the following description, reference being had to the accompanying drawings wherein preferred forms of embodiments of the invention are clearly shown.

BRIEF DESCRIPTION OF THE DRAWINGS:

FIG. 1 is a partial perspective view of a windshield wiper blade assembly constructed in accordance with the present invention;

FIG. 2 is a top elevational view of a blade holder and retaining clip comprising a portion of the assembly of FIG. 1;

FIG. 3 is a side elevational view corresponding with the view of FIG. 1;

FIG. 4 is a top view of a retaining clip;

FIG. 5 is a side view corresponding to FIG. 4;

FIG. 6 is a top view of a modified retaining clip adapted for use in the assembly of FIG. 1;

FIG. 7 is a side view corresponding to FIG. 6; and

FIG. 8 is an end view of the blade holder and flexible wiper blade of FIG. 1.

DESCRIPTION OF THE PREFERRED EMBODIMENTS

Referring in detail to the drawings, a wiper blade assembly constructed in accordance with the present invention is illustrated in FIG. 8 and includes a frame means indicated generally at 10 which is pivotally mounted to the conventional arm driven by the windshield wiper motor with said frame means including holder receiving means in the form of inturned flanges 12 which are adapted to be bent under opposite sides of a blade holder indicated generally at 14 in FIGS. 1 and 2.

Referring in detail to the blade holder of FIGS. 2 and 3, this construction is formed from a pair of parallel metal strips 15 and 17 which are joined and closed at one end by a staple 18 and at the other end by a resilient wire clip such as the clip indicated generally at 30 in FIGS. 4 and 5 or the modified clip indicated generally at 30-A in FIGS. 6 and 7.

As is best seen in FIGS. 4 and 5, clip 30 includes spaced leg portions 32 which are inserted through holes 34 on either side of open end 22 of blade holder 14.

Clip 30 further includes a leg connecting portion 36 and 38 that forms a closure for the open end 22 of the slot 20 and thereby retains a flexible wiper blade 24 in mounted relationship therein.

It should next be mentioned that clip 30 further includes inturned end portions 39 which can be sprung apart and inserted under the end of the wiper frame means 10 in the manner illustrated in FIG. 1.

Reference is next made to FIGS. 6 and 7 which illustrate a modified clip construction 30-A, which includes spaced leg portions 32 and leg connecting portions 36 and 38. The modified clip 30-A functions in the same manner as clip 30 but is provided with out-turned foot portions 40 which underlie the end of of frame means 10 along with the inturned portions 39.

Referring particularly to FIGS. 1 and 8 the previously mentioned flexible wiper blade 24 includes oppositely facing slots 40 for receiving the parallel metal strips 15 and 17 of blade holder 14.

It will now be understood that the clip 30 or 30-A not only forms a closure for open end 22 of slot 20, thereby retaining the flexible wiper blade 24 therein but also includes the previously described portions 39 and 40 which underlie the wiper frame means 10 and serve the additional function of retaining the blade holder on the frame means.

While the forms of embodiments of the present invention as herein disclosed constitute preferred forms, it is to be understood that other forms might be adopted.

I claim:

1. An improved windshield wiper blade assembly comprising, in combination, frame means including holder receiving means; a blade holder mounted in said holder receiving means and including an open ended blade receiving slot; a clip receiving hole at said open end on one side of said slot, and a second clip receiving hole at said open end on the other side of said slot; a flexible wiper blade positioned in said slot from the open end thereof; and a one piece blade retaining clip formed of resilient wire and including spaced resilient longitudinally extending leg portions having depending sections at adjacent ends thereof connected by a transverse member at the lower ends thereof with the depending sections extending through said clip receiving holes with the transverse member overlying an end of said flexible wiper blade and closing the open ended slot and the other ends of the leg portions being turned inwardly and extending into said frame means thereby locking the blade thereto, and said leg portions, said depending sections and said transverse member all being of substantially constant circular cross-section throughout.

* * * * *